(12) United States Patent
Halford et al.

(10) Patent No.: US 6,411,612 B1
(45) Date of Patent: Jun. 25, 2002

(54) SELECTIVE MODIFICATION OF ANTENNA DIRECTIVITY PATTERN TO ADAPTIVELY CANCEL CO-CHANNEL INTERFERENCE IN TDMA CELLULAR COMMUNICATION SYSTEM

(75) Inventors: Karen W. Halford, Melbourne; Gayle Patrick Martin, Merritt Island; Julian Bartow Willingham, Melbourne; Mark A. Webster, Palm Bay; Gregory S. Sinclair, Indian Harbour Beach, all of FL (US)

(73) Assignee: Harris Communication, Melbourne, FL (US)

( * ) Notice: Subject to any disclaimer, the term of this patent is extended or adjusted under 35 U.S.C. 154(b) by 0 days.

(21) Appl. No.: 09/081,287

(22) Filed: May 19, 1998

(51) Int. Cl.$^7$ ............................................... H04B 7/212
(52) U.S. Cl. ..................... 370/347; 455/562; 455/278.1
(58) Field of Search ................................. 370/336, 337, 370/345, 347, 350, 328; 455/561, 562, 278.1; 342/378

(56) References Cited

U.S. PATENT DOCUMENTS

| | | | |
|---|---|---|---|
| 5,363,375 A | 11/1994 | Chuang et al. | 370/95.3 |
| 5,363,376 A | 11/1994 | Chuang et al. | 370/95.3 |
| 5,528,597 A | 6/1996 | Gerszberg et al. | 370/95.3 |
| 5,551,057 A | 8/1996 | Mitra | 455/33.1 |
| 5,574,979 A | 11/1996 | West | 455/63 |
| 5,594,720 A | 1/1997 | Papadopoulos et al. | 370/330 |
| 5,708,441 A * | 1/1998 | Kanai | 342/359 |
| 6,188,913 B1 * | 2/2001 | Fukagawa et al. | 455/562 |
| 6,215,983 B1 * | 4/2001 | Dogan et al. | 455/63 |

* cited by examiner

Primary Examiner—Min Jung
(74) Attorney, Agent, or Firm—Allen, Dyer, Doppelt, Milbrath & Gilchrist, P.A.

(57) ABSTRACT

A base station signal processing mechanism for a time division multiple access (TDMA) cellular communication system adaptively controls weighting coefficients of the base station's phased array antenna in a manner that forms a directivity pattern whose gain and/or nulls maximize the signal to noise ratio in the presence of co-channel users whose communication time slots overlap a communication time slot of a desired user. The signal processing mechanism performs correlation processing of synchronization patterns contained in signals transmitted by co-channel users to identify times of transitions between successive co-channel users' communication time slots relative to a time of transition of the desired user's communication time slot, and deriving weighting coefficients in accordance with the times of transitions.

35 Claims, 8 Drawing Sheets

US 6,411,612 B1

SELECTIVE MODIFICATION OF ANTENNA DIRECTIVITY PATTERN TO ADAPTIVELY CANCEL CO-CHANNEL INTERFERENCE IN TDMA CELLULAR COMMUNICATION SYSTEM

CROSS-REFERENCE TO RELATED APPLICATIONS

The present invention relates to subject matter disclosed in the following co-pending patent applications, filed coincidently herewith; Ser. No. 09/081,476 (hereinafter referred to as the '476 application), by R. Hildebrand et al, entitled "Circular Phased Array Antenna Having Non-Uniform Angular Separations Between Successively Adjacent Elements," and Ser. No. 09/081,460 (hereinafter referred to as the '460 application), by P. Martin et al, entitled "Bootstrapped, Piecewise-Optimum Directivit Control Mechanism for Setting Weighting Coefficients of Phas Array Antenna," each of which is assigned to the assignee f the present application and the disclosures of which are incorporated herein.

FIELD OF THE INVENTION

The present invention relates in general to cellular communication systems, and is particularly directed to a time division multiple access (TDMA) cellular system, in which co-channel interference from users in cells adjacent to a cell containing a desired user is effectively canceled, by adaptively modifying the directivity pattern of that cell's base station phased array antenna, in a manner that dynamically places nulls on those co-channel users whose transmission time slots overlap the time slot of the desired user.

BACKGROUND OF THE INVENTION

In a time division multiple access (TDMA) cellular communication system, a simplified illustration of which is diagrammatically shown in FIG. 1, communications between a base station BS of a respective cell, such as centroid cell 11, and a user within that cell are subject to potential interference by co-channel transmissions from users in cells dispersed relative to cell 11, particularly immediately adjacent cells, shown at 21–71 as being geographically dispersed around cell 11. This potential for co-channel interference is due to the fact that, in order to make maximal use of system resources, the same transmission frequency is employed by multiple system users, who are assigned respectively different time slots for communications (with the base station of their cell).

In the non-limiting simplified example of FIG. 1, the system employs a frequency reuse of one, wherein a given channel in a cell is subdivided into three time slots, each of which is assigned to a respectively different user among a set of three users per cell, as shown in the time slot diagram of FIG. 2. In this example, co-channel users for the respective cells 21, 31, . . . , 71, surrounding cell 11 are shown at 21-1, 21-2 and 21-3; 31-1, 31-2 and 31-3; 41-1, 41-2 and 41-3; 51-1, 51-2 and 51-3; 61-1, 61-2 and 61-3; and 71-1, 71-2 and 71-3. Cell 11 is shown as having users 11-1, 11-2 and 11-3. In this example, preventing interference with communications between user 11-1 and its base station BS from each co-channel user in the surrounding cells 21–71 appears to be an ominous task—ostensibly requiring the placement of twelve nulls in the antenna pattern generated by the antenna employed by the centroid cell's base station BS.

SUMMARY OF THE INVENTION

In accordance with the present invention, this seemingly daunting problem is successfully addressed by taking advantage of the fact that, in a TDMA communication system, only a portion of the plurality of co-channel users will be transmitting at any one time (i.e. only during their assigned time slots). As can be seen in the time slot diagram of FIG. 2, for the illustrated example, this means that, during any user's time slot (such as the time slot $TS_{11}$-1 associated with user 11-1 in cell 11), no more than six potential co-channel interferers in the immediately adjacent cells 21–71 will be transmitting. Consequently, at any given time, a phased-array antenna configuration containing only seven antenna elements would be sufficient to place a null on each active interferer.

The problem is the fact that, even though, at any instant in time, the number of interferers is no more than a fraction of the total number of co-channel users in all of the adjacent cells (only six of the eighteen in the present example), the participants in that number is dynamically changing, as indicated by the eighteen dotted time slot transition lines passing through each half frame of time slots in FIG. 2. Moreover, the time slot assignments for each cell are not synchronized with those of any other cell.

However, since each cell's time slot assignments repeat in a cyclical manner, it is possible to periodically update a set of amplitude and phase weights, through which the directivity pattern of a multi-element (seven element) phased array antenna is controlled in a time division multiplexed manner, so as to effectively follow the changing participants in the pool of interferers, and thereby maintain the desired user effectively free of interference from potential interferers in any of the adjacent cells.

To this end, the present invention employs a phased array antenna having a plurality of antenna elements distributed in a two-dimensional (unbalanced) array and capable of controllably generating a directivity pattern, the gain of which may be defined (reduced) in a plurality of directions (one less than the number of elements in the array), and thereby selectively place nulls on each co-channel user of an adjacent cell. In order to properly adjust the antenna weights, knowledge of which co-channel users may be transmitting at any instant in time is required. This information is derived by monitoring transmissions from co-channel users in adjacent cells and processing contents of these monitored transmissions to determine relative offsets between their assigned time slots and the time slot of a desired user.

In a preferred embodiment of the invention, elements of the base station's phased array are driven by a weighting circuit, to which a set of amplitude and phase weighting coefficients are supplied by a time slot processing unit. In a timing acquisition mode, the antenna array is coupled to the time slot processing unit on the traffic channel, while the channel is idle. This idle time occurs just prior to the desired user being directed to that channel. When the desired user begins transmitting, this timing relationship extracted during this timing acquisition mode is employed to control the directivity pattern of the phased array for data communications for that desired user. Alternatively, the desired user can be nulled until timing is acquired.

The time slot processing unit includes a narrowband digital tuner, which receives an IF output of a downconverter and provides decimated in-phase (I) and quadrature (Q) baseband channels in digital format to a digital signal processor. This processor executes a finite impulse response (FIR) function that is matched to the pulse shape of the received signal and correlates with the embedded synchronization pattern. The finite impulse response function may be implemented as a parallel bank of correlation filters, each of which correlates the subsampled baseband signal with a copy of a respectively different (pseudo noise or PN) synchronization pattern associated with the co-channel interferers of the interfering cells. The correlation filters may be implemented as tapped delay lines to which respective copies of synchronization patterns associated with the co-channel users of the system are coupled. The successive tap weights are the values of a respective synchronization pattern sampled at a rate N/T, where N is the number of samples per symbol and T is the symbol period. Each correlation filter is coupled to an absolute value operator to derive an output representative of the magnitude of the correlation.

The magnitude of this filtered signal is then coupled to a commutated timing selector, which derives the timing of peaks in averaged sets of the correlations of the embedded synchronization patterns associated with the potential co-channel interferers. The timings of these correlation peaks identify times of transitions between successive co-channel user time slots relative to the time of transition of the desired user's time slot. The timing selector includes a demultiplexer, which functions as a cyclical commutator at a rate of N/T. Running totals of the respective outputs of the demultiplexer are accumulated and stored. The contents of each accumulator memory stage are periodically sampled at every CMT seconds, where C is the number of half frames, M is the number of symbols per half frame.

The averaged data values are then coupled to respective threshold comparators. If a respective data value exceeds a threshold, the output of the comparator is a '1'; if a respective data value fails to exceed the threshold, the comparator output is a '0'. These threshold outputs are then stored in a timing acquisition memory. The index of the memory stage whose contents indicate a threshold exceedence (e.g. a '1') identifies the time of occurrence of the synchronization pattern of an interferer.

This extracted timing data is coupled to a weighting coefficient control operator, which adjusts a set of values of the amplitude and phase weighting coefficients for each weighting circuit of the antenna array, as necessary, to form a respective null in the phase array's directivity pattern in the direction of each co-channel interferer whose synchronization pattern correlation peak has been identified by the commutated timing selector.

The antenna's gain and phase weights are only updated as the participants of a pool of interferers changes, namely, the time slot of one of the co-channel interferers terminates and the time slot of another interferer begins. In addition to being applied to the weighting coefficient circuits, the updated weighting values are stored in memory until the next occurrence of the time slot of the last entry in the current pool of co-channel participants. In response to this next occurrence, the set of weight control values for the current pool is updated and used to adjust the phased array's directivity pattern. The newly updated weight set is then stored until the next update interval for the current co-channel user pool.

The directivity pattern produced by updated values of the antenna's weight control elements is maintained by the weighting coefficient control operator, until the next transition between successive time slots of any of the co-channel users in the adjacent cells (corresponding to a new pool of co-channel users, in which the time slot of a previous user has terminated and that of a new user begun in its place).

DETAILED DESCRIPTION

Figure 1:
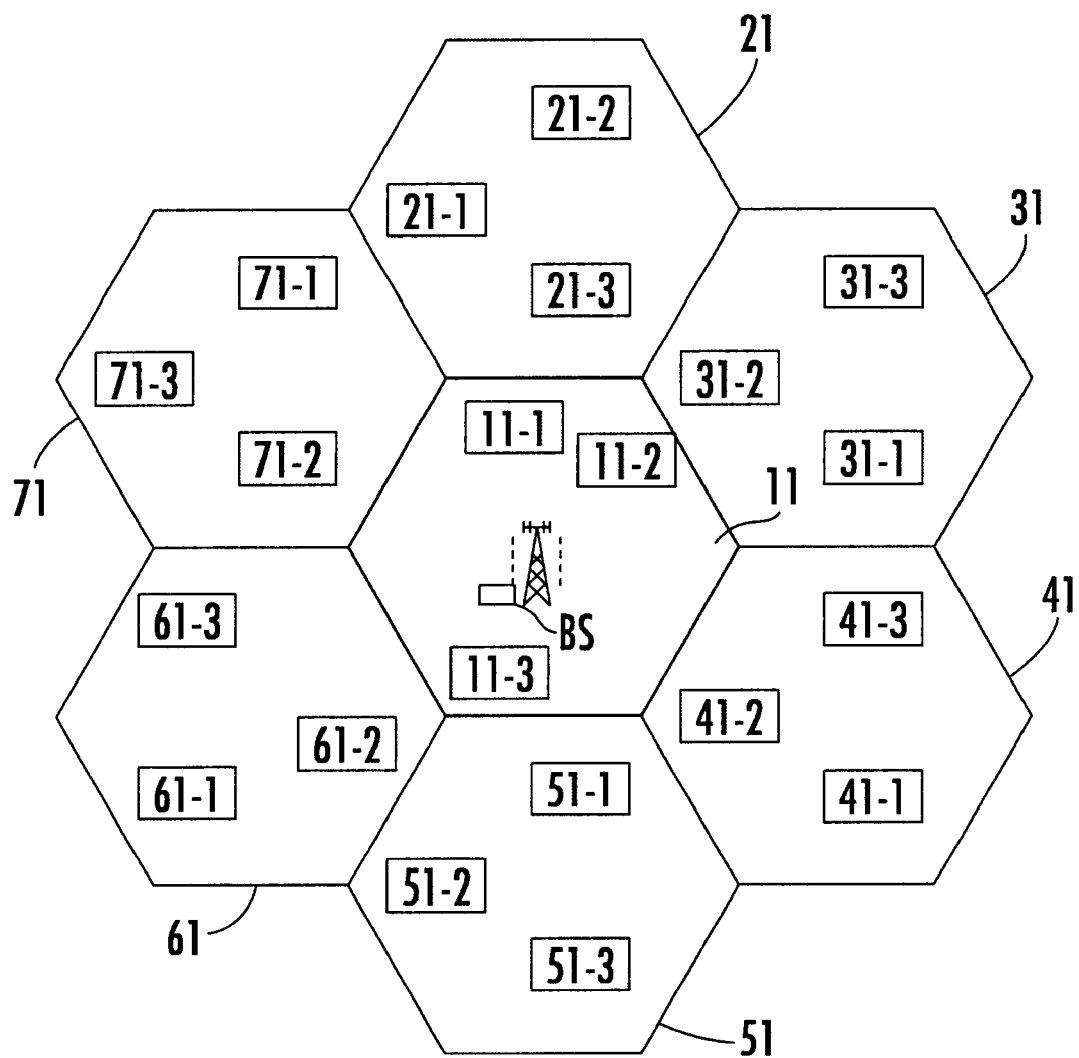
FIG. 1 is a simplified diagrammatic illustration of the cell distribution of a time division multiple access (TDMA) cellular communication system.

Before describing in detail the new and improved adaptive directivity pattern nulling scheme in accordance with the present invention, it should be observed that the invention resides primarily in what is effectively a prescribed arrangement of conventional communication circuits and associated signal processing components and attendant supervisory control circuitry therefor, that controls the operations of such circuits and components.

Consequently, the configuration of such circuits and components, and the manner in which they are interfaced with other communication system equipment have, for the most part, been illustrated in the drawings by readily understandable block diagrams. These diagrams show only those specific details that are pertinent to the present invention, so as not to obscure the disclosure with details which will be readily apparent to those skilled in the art having the benefit of the description herein.

Thus, the block diagram illustrations are primarily intended to show the major components of the system in a convenient functional grouping, whereby the present invention may be more readily understood. For purposes of providing a non-limiting example of a communication system in which the present invention may be employed, the description to follow will describe its application to an industry standard IS-136 TDMA cellular system. It should be understood that the invention is not limited to use with this or any other system, but is effectively applicable to any type of cellular TDMA system.

As described briefly above, the directivity pattern control mechanism of the present invention takes advantage of the fact that, at any instant during a user's time slot, only a portion of the co-channel users of adjacent cells will be transmitting. For the seven cell system of FIGS. 1 and 2, at any time during a respective transmission time slot of the three time slots $TS_{11}$-1, $TS_{11}$-2 and $TS_{11}$-3 of cell 11, no more than six potential co-channel interferers in the immediately adjacent cells 21–71 will be transmitting.

Figure 2:
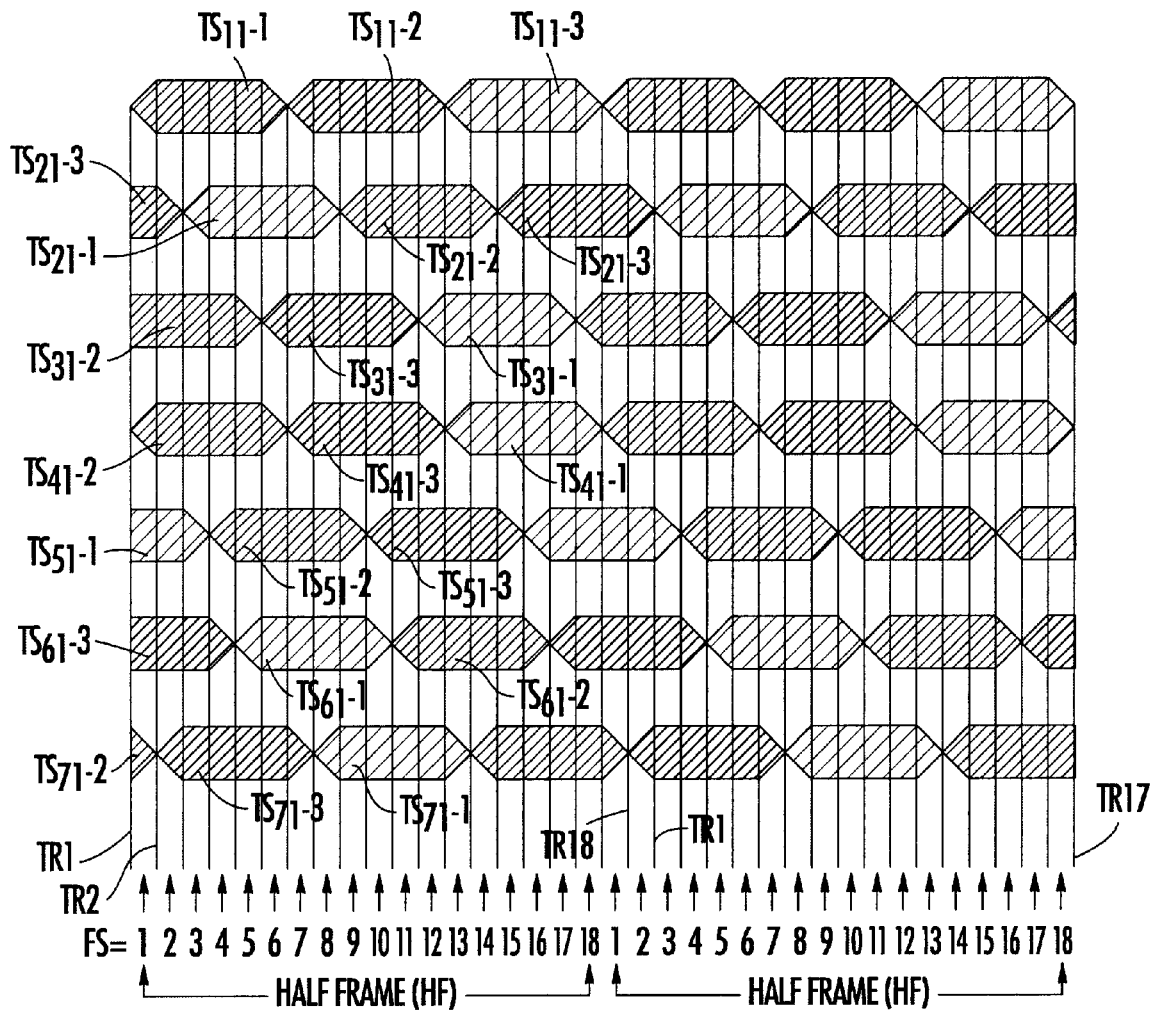
FIG. 2 is a time slot diagram associated with the co-channel users of the respective cells of FIG. 1.

However, because the participants in that pool of six change a synchronously, as shown by the eighteen time slot transition lines TR1–TR18 passing through each half frame of time slots in FIG. 2, some mechanism must be employed to determine the timing relationship between time slots of a cell of interest and those of adjacent cells containing potential co-channel interferers.

The timing relationship is readily determined by correlating a set of reference signals, such as a set of synchronization patterns, known a priori to be associated with the respective co-channel users of the adjacent cells, with the contents of signals received by the base station of the cell containing the user of interest. Since the synchronization pattern of a respective time slot occurs a fixed interval subsequent to the start of that time slot, identifying when the peak of a respective correlation occurs is used to indicate the beginning of a co-channel user's time slot relative to the beginning of the desired user's time slot. This knowledge of the exact times of occurrence of the assigned time slots of co-channel interferers is then used to dynamically adjust values of amplitude and phase control weights for phased array elements of the base station's antenna, as necessary, to place a respective null on each co-channel interferer whose transmission time slot is currently active.

Figure 3:
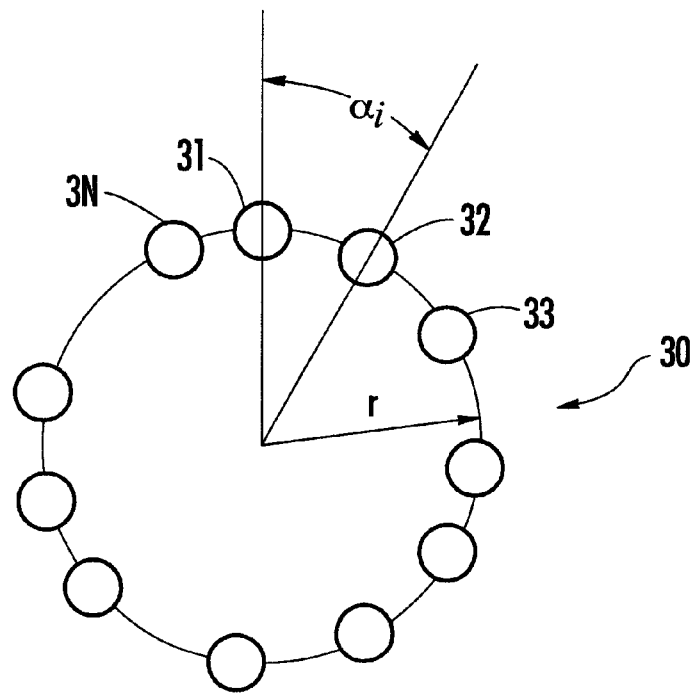
FIG. 3 is a diagrammatic plan view of a phased array antenna of the type described in the above-referenced co-pending '476 application.
Figure 4:
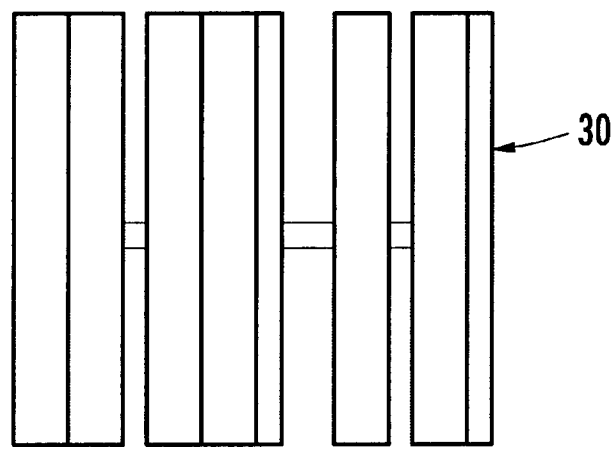
FIG. 4 is a diagrammatic side view of a phased array antenna of the type described in the above-referenced co-pending '476 application.

In accordance with a preferred embodiment of the present invention, the base station's antenna may be configured as a phased array antenna arrangement of the type described in the above-referenced co-pending '476 application, by R. Hildebrand et al, entitled "Circular Phased Array Antenna Having Non-Uniform Angular Separations Between Successively Adjacent Elements." As illustrated diagrammatically in the plan view of FIG. 3 and the side view of FIG. 4, this phased array antenna architecture has a plurality of N antenna (dipole) elements 31, 32, 33, . . . 3N unequally distributed in a two-dimensional array, she as a generally non-linear array, such as a circular array 3D. The dipoles are oriented to produce a directivity patter generally parallel to the plane of the array. Preferably, the diameter of the array is at least an order of magnitude greater than the wavelength of the carrier center frequency of interest.

The unequal angular spacing between successively adjacent antenna elements $3_i$ and $3_{i+1}$ is defined so as to decorrelate the separations thereamong, such that for any radial line 'r' intersecting an element of the array 30, the vector distance from any point along that radial direction to any two elements of the array is unequal and uniformly distributed in phase (modulo $2\pi$). To implement this decorrelating vector distance criterion, the angular separation between any two successively adjacent antenna elements $3_i$ and $3_{i+1}$, as one proceeds around the array 30, may vary in accordance with an Nth root of two, wherein N is the total number N of antenna elements in the array.

In particular, the angular separation between successive ones of the N antenna elements of the array is such that, for one element located at any arbitrary location along the array, the angular spacing $\alpha_1$ of a second element relative to the first element is defined by $\alpha_1 = 2\pi*(2^{1/N}-1)$. The angular spacing a of each additional element relative to the first element is defined by $\alpha_j = \alpha_{j-1} * 2^{1/n}$, where j varies from 2 to N. In order to place a null on each of the potential interferers in adjacent cells 21–71 that may be simultaneously transmitting during a desired user's time slot, N is at least one more than the maximum number of potential interferers (six in the present example).

Figure 5:
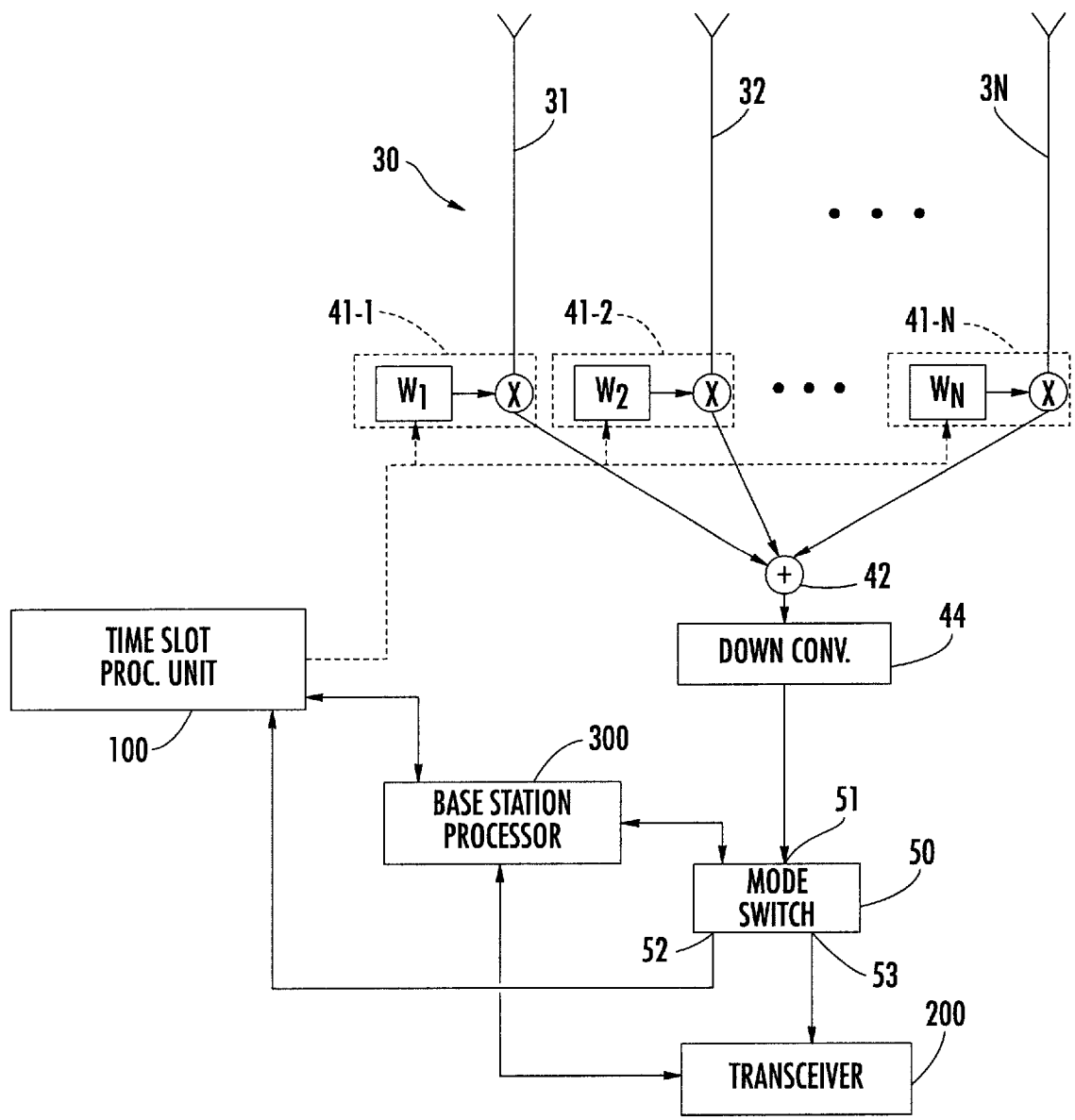
FIG. 5 shows respective elements of a base station's phased array antenna coupled to adaptive weighting coefficient control circuitry for deriving amplitude and phase weighting coefficients in accordance with the invention so as to dynamically place nulls on co-channel users whose transmission time slots overlap the time slot of a desired user.

As shown in FIG. 5, each of the respective elements $3i$ of the base station's antenna array is coupled to a respective weighting circuit 41-i, which is coupled to receive a set of amplitude and phase weighting coefficients $(W_A, W_\Phi)_i$, shown as weights $W_1, \ldots, W_N$ supplied by a time slot processing unit 100. The outputs of the respective weighting circuits 41-1–41-N are summed in summing unit 42, and coupled to an RF-IF downconverter 44, the output of which is coupled to a first port 51 of a mode switch 50. Mode switch 50 has a second port 52 coupled to time slot processing unit 100, and a third port 53 coupled to a transceiver 200. Under the control of the base station's supervisory processor 300, the mode switch 50 selectively couples the elements of the antenna array 30 to one of the time slot processing unit 100 and the base station transceiver 200.

In timing acquisition mode, in which the timing relationship between the time slots of the base station's cell and those of the adjacent cells containing potential co-channel interferers is determined, the array 30 is coupled to the time slot processing unit 100 during one of the time slots available to users in cell 11 for traffic signalling, but currently unassigned to any of those users. In traffic signalling mode, in which the timing relationship previously extracted during timing acquisition mode is employed to control the directivity pattern of the phased array, the array 30 is coupled to the transceiver 200.

Because a desired user's signal will overwhelm any interferer's signal, it is necessary to effectively remove the desired user from the weight determination process. This may be accomplished by either processing interferers's transmissions that overlap the time slot assigned to the desired user before the desired user begins transmitting, or by controlling a weighting coefficient control operator, to be described, so as to set the amplitude and phase weighting coefficients at values that place a null on the desired user.

Figure 6:
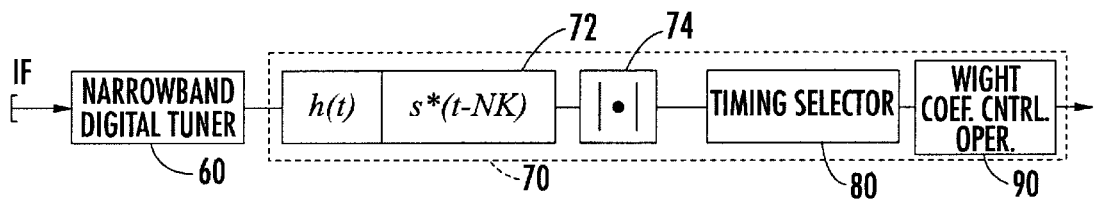
FIG. 6 diagrammatically illustrates the overall signal processing architecture of a time slot processing unit of the adaptive weighting coefficient control circuitry of FIG. 5.

Time slot processing unit 100 is diagrammatically illustrated in FIG. 6 as comprising a narrowband digital tuner 60 (shown in detail in FIG. 7, to be described), which is coupled to receive the IF output of downconverter 44, that downconverts the RF output of the summing unit 42 to IF, and provides a pair of decimated in-phase (I) and quadrature (Q) channels in digital format for application to a digital signal processor (DSP) 70. DSP 70 includes an h(t) operator 71 and a finite impulse response (FIR) filter function 72 that is matched to the pulse shape of the received signal and correlates with its embedded synchronization pattern.

The magnitude of this filtered signal, derived by a magnitude function operator 74 is then coupled to a commutated timing selector 80 (shown in detail in FIG. 10, to be described), which derives the timing of peaks in average sets of the correlations of the embedded synchronization patterns associated with the potential co-channel interferers. As pointed out above, the timings of these correlation peaks identify times of transitions between successive co-channel user time slots relative to the time of transition of the desired user's time slot.

This timing data is then coupled to a weighting coefficient control operator 90, which adjusts a set of values of the amplitude and phase weighting coefficients $(W_A, W_\Phi)_i$ for each respective weighting circuit 41-i of the antenna array 30, as necessary, so as to form a respective null in the phase array's directivity pattern in the direction of each co-channel interferer whose synchronization pattern correlation peak has been identified by the commutated timing selector 80.

Figure 7:
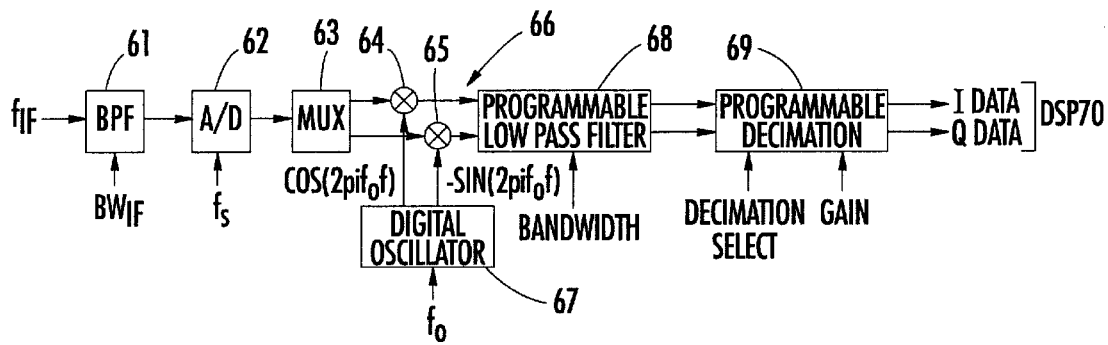
FIG. 7 diagrammatically illustrates a narrowband digital tuner of the time slot processing unit of FIG. 6.
Figure 8:
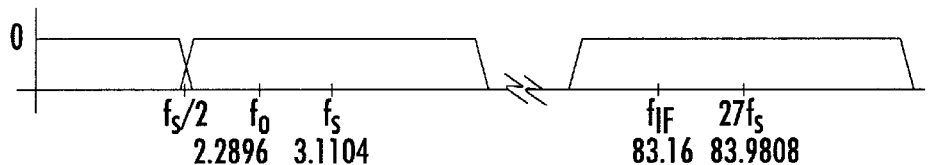
FIG. 8 is a spectrum diagram associated with the operation of the narrowband digital tuner of FIG. 7.

The narrowband digital tuner 60 is in detail in FIG. 7 as comprising a band pass filter 61, to which the IF output from the systems's RF-IF downconverter stage (not shown) is coupled. As a non-limiting example, for an IS-136 channel, bandpass filter 61 may have an IF center frequency on the order of 83.16 MHz, and an IF 3 dB bandwidth of 30 KHz, as shown in FIG. 8. The bandpass filtered signal output from filter 61 is then digitized by analog-to-digital converter (ADC) 62. For the present IS-136 example, ADC may have an analog bandwidth of at least 100 MHZ, a sampling rate $f_s$ of 3.1104 MHz, an aperture jitter time of no greater than ten picoseconds, and a code resolution on the order of ten bits per sample.

Figure 9:
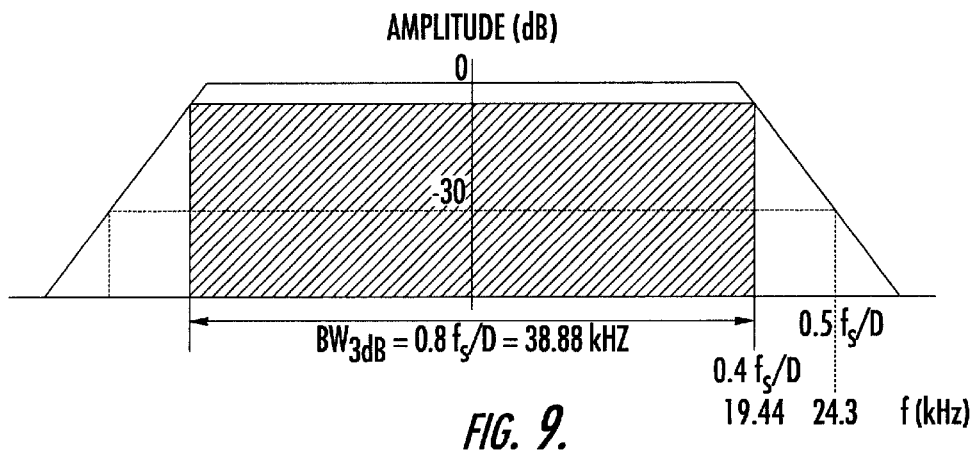
FIG. 9 shows the low pass characteristic of the programmable low pass filter of the narrowband digital tuner of FIG. 7.

The digitized signal is then coupled to a multiplexer 63, which supplies two copies of the filtered IF signal to respective mixers 64 and 65 of a quadrature channel baseband downconverter 66. Mixers 64 and 65 are further coupled to receive respective quadrature versions (COS $2\pi f_o t$ and $-SIN\ 2\pi f_o t$), where t is the sampling period, from a digitally controlled oscillator 67, having a local oscillator frequency $f_o$ on the order of $(f_{IF} - 26 f_s)$ or $(83.16 - 80.8704) = 2.2896$ MHz. Downconverter 66 produces a pair of (I/Q) baseband signals, which are coupled to a programmable low pass filter 68, having a bandwidth on the order of 38.88 kHz, centered at DC, as shown in FIG. 9.

The baseband signal is then decimated by a (gain and range programmable) digital decimator 69, to produce respective I and Q data values. As a non-limiting example, for an IS-136 symbol rate of 24.3 ks/s, the baseband signal may be decimated by a factor of sixty-four, to produce a pair of I and Q signals sampled at twice the symbol rate. This subsampled signal is then coupled to DSP 70, which executes a finite impulse response (FIR) function that is matched the pulse shape of the received signal and correlates with its embedded synchronization pattern.

Figure 10:
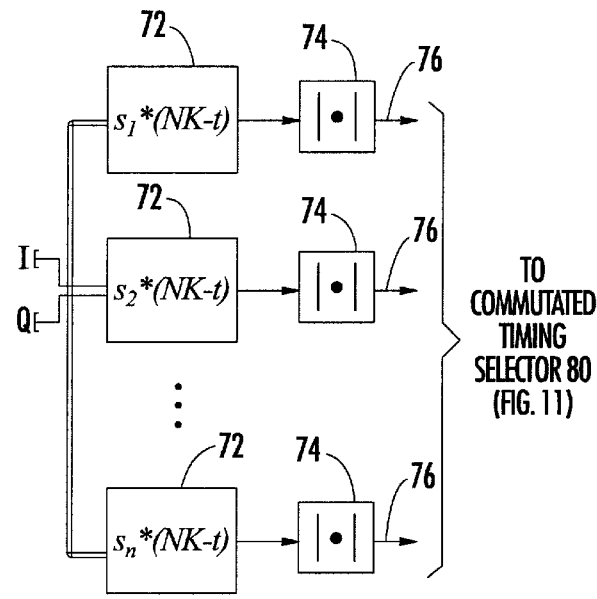
FIG. 10 shows a parallel bank of correlation filters for implementing the finite impulse response filter of the time slot processing unit of FIG. 6.

As shown in FIG. 10, the finite impulse response function may be implemented as a parallel bank of correlation filters 72, each of which correlates the subsampled baseband signal with a copy of a respectively different (pseudo noise or PN) synchronization pattern $S_i$ of K symbols in length, associated with the co-channel interferers of cells 20–70. Each correlation filter may be implemented as a tapped delay line, comprising a series of tap weight multiplier and summing stages, to which respective copies of synchronization patterns $S_i$ associated with the co-channel users of the system and delayed versions of the subsampled baseband signal are coupled, with the respective products being summed to produce a correlation filter output. The successive tap weights of a respective correlation filter are the values of a respective synchronization pattern sampled at a rate N/T, where N is the number of samples per symbol (e.g., two) and T is the sample period. The output of each correlation filter 72 is then coupled to an absolute value operator 74, which produces an output 76 representative of the magnitude of the correlation.

Figure 11:
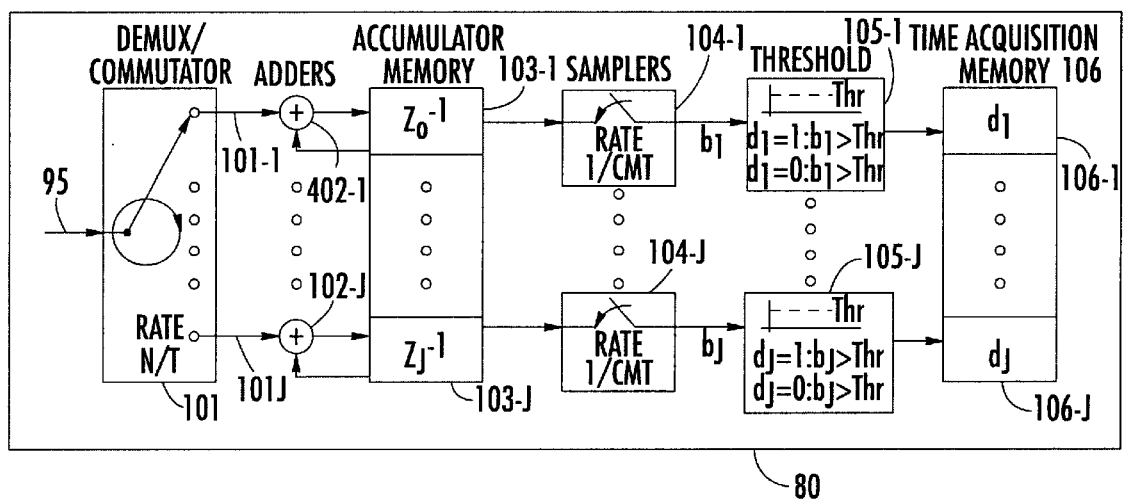
FIG. 11 shows the signal processing architecture of the commutated timing selector of the time slot processing unit of FIG. 6.

The magnitude of each correlation filter 72 is coupled to the commutated timing selector 80 shown in detail in FIG. 11, which is operative to derive the timing of peaks in average sets of the correlations of the embedded synchronization patterns associated with the potential co-channel interferers. For this purpose, each correlation magnitude output 76 is coupled to a demultiplexer 101, which functions as a cyclical commutator at a rate of N/T, producing twice the number of symbols in a respective one of the half frames of FIG. 2. Running totals of the respective outputs 101-1–101-J of demultiplexer 101 are accumulated and stored via a set of adders 102-1–102-J and associated stages 103-1–103-J of an accumulator memory 103. The contents of each accumulator memory stage 103-i are periodically sampled by samplers 104-1–104-J every CMT seconds, where C is the number of half frames (e.g., ten as a non-limiting example), M is the number of symbols per half frame (for the present IS-136 example: 162 ×3=486) and J=N×M (97270 in the present IS-136 example). Each memory stage 103-i is then cleared in preparation for receiving new data.

The averaged data values $b_1$–$b_j$ are then coupled to respective threshold comparators 105-1–105-J. If a respective data value $b_i$ exceeds a prescribed threshold value Thr, the output $d_i$ of the comparator 105-i is a first prescribed value (e.g., a '1'); if a respective data value $b_i$ fails to exceed the threshold value Thr, the output $d_i$ of the comparator 105-i is a second prescribed value (e.g., a '0'). The threshold outputs $d_i$–$d_J$ are then stored in respective stages 106-1–106-J of a timing acquisition memory 106. The index of the memory stage 106 whose contents indicate a threshold exceedence (e.g., '1's) identifies the time of occurrence of the synchronization pattern of an interferer.

Figure 12:
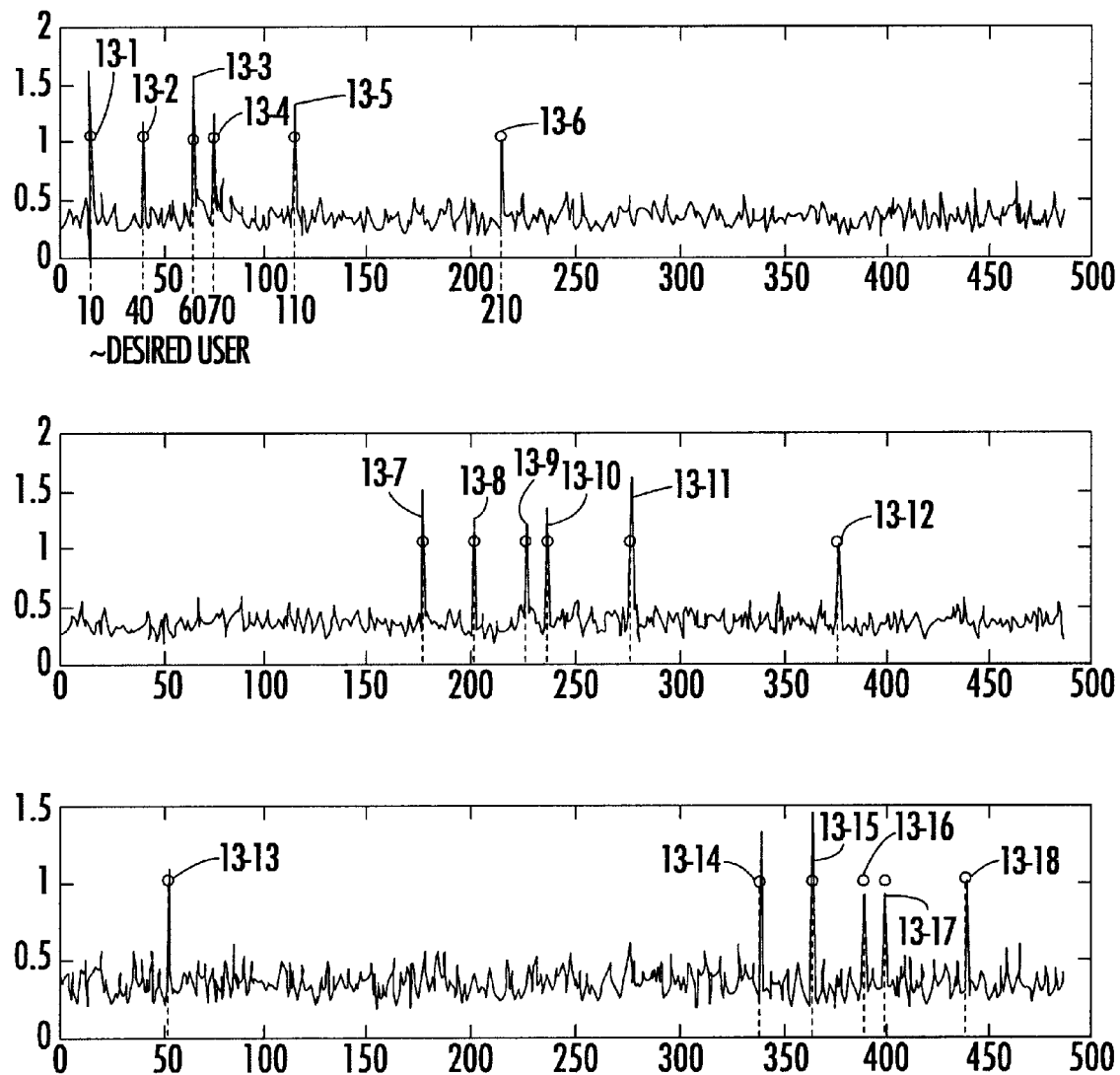
FIG. 12 shows an example of three sets of correlation peaks that result from the processing carried out by the time slot processing unit of FIG. 6.

FIG. 12 shows an example of three sets of correlation peaks 13-1–13-18 that result from the processing carried out by the time slot processing unit 100 described above for the case of three co-channel interferers per cell of the TDMA cellular communication system diagrammatically shown in FIG. 1, and which are readily identifiable from the accumulation and threshold operations of the commutated timing selector of FIG. 11. As noted above, since, within any user's assigned TDMA time slot, the synchronization pattern $S_i$ falls within a fixed window (in time) relative to the beginning of a time slot TS, by locating the peaks of the correlations of the co-channel users' synchronization patterns, then for any frame segment (FS) 1–18 of a half frame falling between successive dotted time slot transition lines TR1–TR18 of FIG. 2, it is possible to locate the beginning of each interferer time slot that overlaps such a segment. This is readily accomplished in the operation of commutation timing selector 80 by incorporating the offset into the indexing of the respective stages of memory 105.

As described above, the timing data derived by the commutating timing selector 80 and stored in memory 106 is coupled to weighting coefficient control operator 90, which adjusts the values of a set of amplitude and phase weighting coefficients $(W_A, W_\Phi)_i$ for each respective weighting circuit 41-i of the antenna array 30, to place respective nulls in the phase array's directivity pattern in the direction of the identified co-channel interferers. Although the algorithm executed by operator 90 is not limited to any particular implementation, non-limiting examples of the algorithm include the PSF algorithm described in U.S. Pat. No. 4,255, 791 to P. Martin entitled: "Signal Processing System," issued Mar. 10, 1981, and the "Maximum SNR Method," described in the text "Introduction to Adaptive Arrays," by R. Monzingo et al, published 1980, by Wiley and Sons, N.Y.

Alternatively, and in accordance with a preferred embodiment of the present invention, the weighting coefficient control operator 90 may execute a bootstrapped, piecewisedirectivity pattern control mechanism of type described in the above-referenced co-pending Martin et al '460 application. As described therein, such a bootstrapped mechanism continuously monitors signals received by a plurality of antenna elements and processes these signals by means of an iterative weighting coefficient processing mechanism. After a predefined number of iterations, the bootstrapped scheme yields a set of (amplitude and phase) weighting coefficients through which the directivity pattern is defined so as to maximize the signal to noise ratio.

Irrespective of the weighting coefficient algorithm employed, antenna gain and phase weights are only updated as the participants of a pool of interferers changes—the time slot of one of the (six) co-channel interferers terminates and the time slot of another interferer begins. In addition to being applied to the weighting coefficient circuits 41, these updated weighting values are stored in memory until the next (cyclically repeating) occurrence of the time slot of the last (in time) entry in the current pool of co-channel participants. In response to this next occurrence, the set of weight control values for the current pool is updated and used to adjust the phased array's directivity pattern. The newly updated weight set is then stored until the next (periodically repeated) update interval for the current co-channel user pool, and so on.

Thus, for the case of the first time slot $TS_{11}$ of the desired user's timing pattern of FIG. 2, the first frame segment (FS) 1 is shown as beginning at time slot transition TR1 between successive time slots $TS_{41}$-2 and $TS_{41}$-1, and ending at time slot transition TR2 between successive time slots $TS_{71}$-2 and $TS_{71}$-3. Since the frame segment FS-1 overlaps each of time slots $TS_{21}$-3, $TS_{31}$-2, $TS_{41}$-2, $TS_{51}$-1, $TS_{61}$-3 and $TS_{71}$-2, the outputs 95 of commutated timing selector will identify the beginning of each of these time slots, as described above. During frame segment FS-1, the weighting coefficient control operator 90 will update the values of the amplitude and phase weighting coefficients ($W_A, W_\Phi$) for the weighting circuits 41-i of the antenna array 30, so as to place respective nulls in the phase array's directivity pattern in the direction of co-channel interferers 21-3, 31-2, 41-2, 51-1, 61-3 and 71-2, as diagrammatically illustrated in FIG. 13.

Since these updated weighting values are used only for this particular pool of users in the current half frame $HF_i$, whose assigned time slots will not overlap until the first frame segment of the next half frame $HF_{i+1}$, they are stored until the next (cyclically repeating) occurrence of the time slot of the last (in time) entry in the current pool of co-channel participants, which begins at the transition between the end of frame segment (FS) 18 of the half frame $HF_i$ and the start of frame segment (FS) 1 of the next first half frame $HF_{i+1}$.

Figure 13:
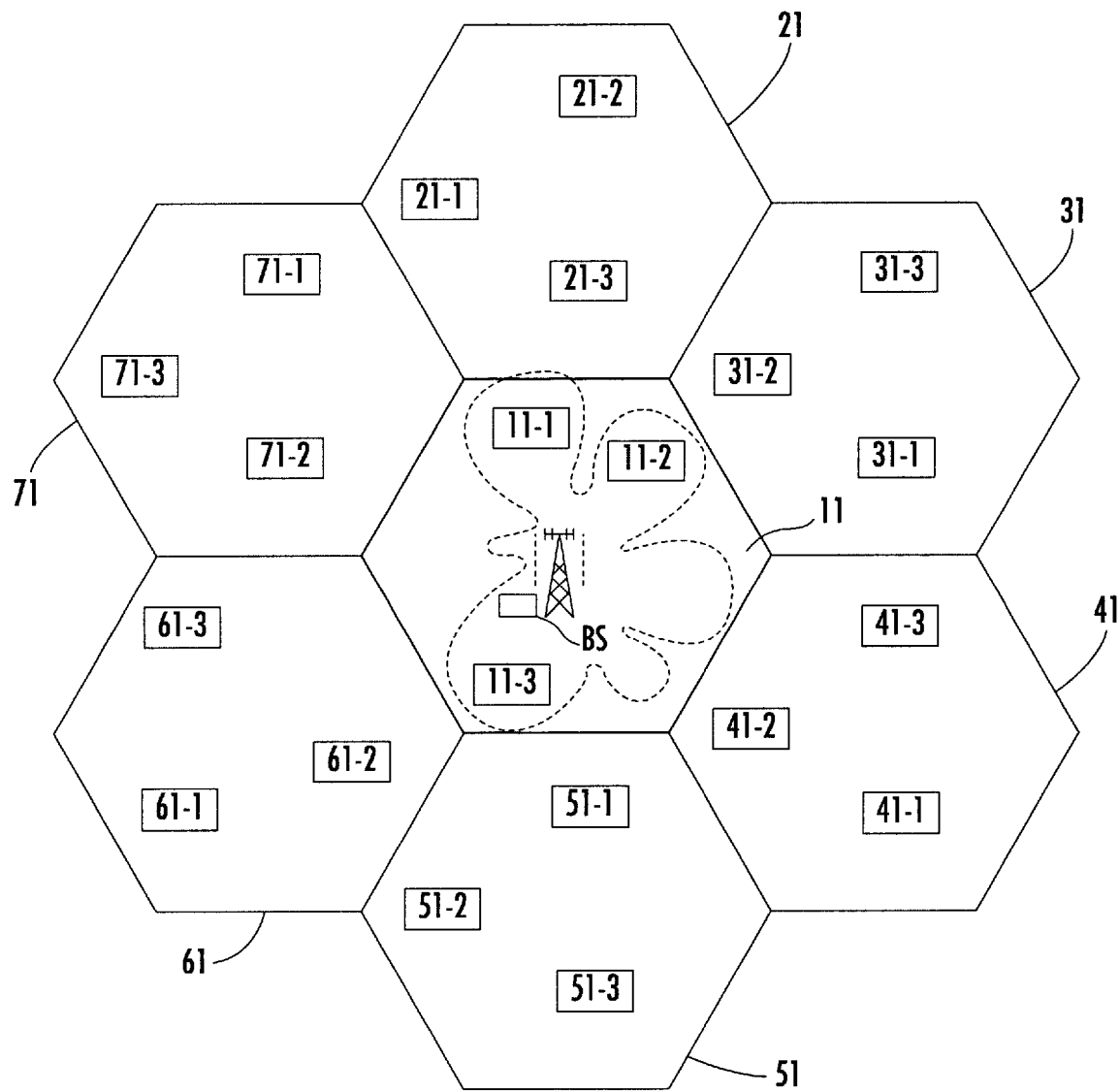
FIGS. 13 shows an example of a directivity pattern that may be produced by a phased array antenna, whose weighting coefficient coefficients are driven to place nulls on respective sets of TDMA co-channel interferers in accordance with the adaptive control mechanism of the invention.

The directivity pattern produced by these updated values of the antenna's weight control elements 41-i, shown in FIG. 13, is maintained by the weighting coefficient control operator 90 until the next transition between successive time slots of any of the co-channel users in the adjacent cells (corresponding to a new pool of co-channel users, in which the time slot of a previous user has terminated and that of a new user begun in its place).

As will be appreciated from the foregoing description, in accordance with the present invention, the problem of co-channel interference in a TDMA cellular communication system is effectively prevented by dynamically adjusting weighting coefficients of a two-dimensional unbalanced phased array antenna, so as to modify the antenna's directivity pattern, as necessary to selectively place nulls on each co-channel user of an adjacent cell. In order to properly adjust the antenna weights, knowledge of which co-channel users may be transmitting at any instant in time is required. This information is derived by monitoring transmissions from co-channel users in adjacent cells and correlating with synchronization patterns of these monitored transmissions to determine relative offsets between their assigned time slots and the time slot of a desired user.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with a time division multiple access (TDMA) cellular communication system having a plurality of cells, that are dispersed relative to a cell in which a desired user conducts communications with a base station in said cell, and wherein said dispersed cells contain users which may transmit during time slots that overlap a user time slot used for communications between said user and said base station, a method of reducing interference, as a result of transmissions from said users in said dispersed cells during said time slots, with communications between said user and said base station, said method comprising, at said base station, the steps of:

(a) communicating with said user by way of an antenna having a directivity pattern the gain of which may be selectively reduced in directions of said users in said dispersed cells;

(b) receiving transmissions from said users in said dispersed cells and processing contents of received transmissions to determine offsets of said time slots relative to said user time slot; and (c) adjusting said directivity pattern in accordance with said relative offsets determined in step (b), so as to selectively reduce the gain of said directivity pattern in said directions of said users in said dispersed cells during said users' time slots.

2. A method according to claim 1, wherein said antenna comprises a multi-element phased array antenna.

3. A method according to claim 2, wherein said multi-element phased array antenna comprises a two-dimensional arrangement of antenna elements.

4. A method according to claim 2, wherein said multi-element phased array antenna has a variable spacing between adjacent antenna elements.

5. A method according to claim 2, wherein said multi-element phased array antenna comprises a generally circular array of antenna elements.

6. A method according to claim 5, wherein spacings between successive antenna elements of said generally circular array vary such that, for any point on a radial line in the plane of said circular array and passing through an element of said circular array, the vector distance to any two antenna elements is unequal and uniformly distributed modulo $2\pi$.

7. A method according to claim 6, wherein the angular separation between successive antenna elements varies in accordance with an Nth root of two, wherein N is the number of antenna elements of said circular array.

8. A method according to claim 6, wherein the angular separation between successive ones of the N antenna elements of the array is such that, for one element located at any arbitrary location along the array, the angular spacing $\alpha_1$ of a second element relative to the first element is defined by $\alpha_1=2\pi*(2^{1/N}-1)$, and wherein the angular spacing $\alpha_j$ of each additional element relative to the first element is defined by $\alpha_j=\alpha_{j-1}*2^{1/N}$, where j varies from 2 to N.

9. A method according to claim 1, wherein said contents of said transmissions processed in step (b) comprise synchronization patterns contained in said transmissions, and wherein step (b) comprises correlating with synchronization patterns contained in said transmissions to identify correlation peaks associated with times of transitions between successive ones of said users' time slots relative to a time of transition of said user time slot.

10. A method according to claim 2, wherein said multi-element phased array antenna has a plurality of amplitude and phase weight control elements associated with said elements of said antenna, and wherein step (c) comprises adjusting said weight control elements in accordance with said offsets of time slots determined in step (b), so that said directivity pattern has reduced gain in said directions of said users in said dispersed cells during said users, time slots.

11. A method according to claim 10, wherein step (c) comprises updating values of said weight control elements of said antenna, in response to a transition between successive ones of said users' time slots, and maintaining said values of said weight control elements of said antenna until a further transition between successive ones of said users' time slots.

12. A method according to claim 10, wherein step (c) comprises, for a respective set of said users having time slots that overlap said user time slot, generating a respective set of values of said weight control elements of said antenna that are effective to reduce the gain of said directivity pattern in the direction of each of said users of said respective set of users for the duration of their overlap with said user time slot, and adjusting said directivity in accordance with said respective set of values of said weight control elements, so as to selectively reduce the gain of said directivity pattern in the direction of each of said users of said respective set of users and, in response to another respective set of said users having time slots that overlap said user time slot, generating another set of values of said weight control elements of said antenna that are effective to reduce the gain of said directivity in directions of each of the users of said another set of users for the duration of their overlap of said user time slot, and adjusting said directivity pattern in accordance with said another respective set of values of said weight control elements, so as to selectively reduce the gain of said directivity pattern in the direction of each of the users of said another respective set of users.

13. A method according to claim 12, wherein step (c) comprises, for each respective set of said users having time slots that overlap said user time slot, storing an associated set of values of said weight control elements of said antenna that are effective to reduce the gain of said directivity pattern in the direction of each of said users of said each respective set of users, until the next occurrence of time slots of said each respective set of users overlapping said user time slot and, in response to said next occurrence, updating said respective set of values of said weight control elements of said antenna that are effective to reduce the gain of said directivity pattern in the direction of each of said users of said respective set of users.

14. A method according to claim 1, wherein step (b) comprises receiving transmissions from said users in said dispersed cells exclusive of a transmission from said user in said cell, and processing contents of said transmissions from said users to determine relative offsets between said users' time slots and said user time slot.

15. For use with a time division multiple access (TDMA) cellular communication system, a method of preventing co-channel interference from users in cells adjacent to a cell containing a desired user comprising the
steps of:
(a) providing a base station in said cell with a phased array antenna; and
(b) adaptively modifying the directivity pattern of said base station's phased array antenna, in a manner that forms a beam whose gain and/or nulls maximize the signal to noise ratio in the presence of co-channel users whose communication time slots overlap a communication time slot of said desired user.

16. A method according to claim 15, wherein said phased array antenna comprises a circular array of antenna elements, and wherein spacings between successive antenna elements of said generally circular array vary such that, for any point on a radial line in the plane of said circular array and passing through an element of said circular array, the vector distance to any two antenna elements is unequal and uniformly distributed modulo $2\pi$.

17. A method according to claim 16, wherein the angular separation between successive antenna elements varies in accordance with an Nth root of two, wherein N is the number of antenna elements of said circular array.

18. A method according to claim 16, wherein the angular separation between successive ones of the N antenna elements of the array is such that, for one element located at any arbitrary location along the array, the angular spacing $\alpha_1$ of a second element relative to the first element is defined by $\alpha_1 32\ 2\pi*(2^{1/N}-1)$, and wherein the angular spacing $\alpha_j$ of each additional element relative to the first element is defined by $\alpha_j=\alpha_{j-1}*2^{1/N}$, where j varies from 2 to N.

19. A method according to claim 15, wherein said antenna elements of said base station's phased array are driven by a set of weighting coefficients, and wherein step (b) comprises, during an unused time slot, deriving values of said set of weighting coefficients that are effective to form a beam whose gain and/or nulls maximize the signal to noise ratio in the presence of co-channel users whose communication time slots overlap a communication time slot of said desired user.

20. A method according to claim 15, wherein step (b) comprises correlating with synchronization patterns contained in transmissions from said users to identify times of transitions between successive ones of said users' time slots relative to a time of transition of said desired user's time slot, and deriving said set of weighting coefficients in accordance with said times of transitions.

21. A method according to claim 20, wherein step (b) further comprises said weighting coefficients, in response to a transition between successive ones of said users' time slots, and maintaining said values of said weighting coefficients until a further transition between successive ones of said users' time slots.

22. For use with a time division multiple access (TDMA) cellular communication system having a plurality of cells, that are dispersed relative to a cell in which a desired user conducts communications with a base station in said cell, and wherein said dispersed cells contain co-channel users which may transmit during time slots that overlap a desired user's time slot used for communications between said desired user and said base station, a base station signal processing arrangement for reducing interference of communications between said desired user and said base station, by transmissions from said co-channel users in said dispersed cells during said time slot, comprising:

a phased array antenna; and a signal processor, coupled to said phased array antenna and being operative to process signals transmitted from said co-channel users, and adaptively modify the directivity pattern of said phased array antenna in a manner that forms a beam whose gain and/or nulls maximize the signal to noise ratio in the presence of co-channel users whose communication time slots overlap a communication time slot of said desired user.

23. A base station signal processing arrangement according to claim 22, wherein said antenna comprises a non-linear array of antenna elements having a variable spacing between adjacent antenna elements.

24. A base station signal processing arrangement according to claim 22, wherein said phased array antenna comprises a generally circular array of antenna elements, and wherein spacings between successive antenna elements of said generally circular array vary such that, for any point on a radial line in the plane of said circular array and passing through an element of said circular array, the vector distance to any two antenna elements is unequal and uniformly distributed modulo $2\pi$.

25. A base station signal processing arrangement according to claim 24, wherein the angular separation between successive antenna elements varies in accordance with an Nth root of two, wherein N is the number of antenna elements of said circular array.

26. A base station signal processing arrangement according to claim 25, wherein the angular separation between successive ones of the N antenna elements of the array is such that, for one element located at any arbitrary location along the array, the angular spacing $\alpha_1$ of a second element relative to the first element is defined by $\alpha_1 = 2\pi*(2^{1/N}-1)$ and wherein the angular spacing $\alpha_j$ of each additional element relative to the first element is defined by $\alpha_j = \alpha_{j-1}*2^{1/N}$, where j varies from 2 to N.

27. A base station signal processing arrangement according to claim 22, wherein antenna elements of said base station's phased array are driven by a set of weighting coefficients, and wherein said signal processor is operative, during an unused time slot, to derive values of said set of weighting coefficients that are effective to form a beam whose gain and/or nulls maximize the signal to noise ratio in the presence of co-channel users whose communication time slots overlap a communication time slot of said desired user.

28. A base station signal processing arrangement according to claim 27, wherein said signal processor is operative to perform correlation processing of synchronization patterns contained in signals transmitted by said co-channel users to identify times of transitions between successive ones of said users' communication time slots relative to a time of transition of said desired user's communication time slot, and deriving said set of weighting coefficients in accordance with said times of transitions.

29. A base station signal processing arrangement according to claim 28, wherein signal processor is operative to perform correlation processing of said synchronization patterns to identify correlation peaks associated with times of transitions between successive ones of said users' communication time slots relative to a time of transition of said user communication time slot.

30. A base station signal processing arrangement according to claim 27, wherein said signal processor is operative to update values of said weighting coefficients, in response to a transition between successive ones of said users' communication time slots, and maintaining said values of said weighting coefficients until a further transition between successive ones of said users' communication time slots.

31. A base station signal processing arrangement according to claim 28, wherein said signal processor comprises a narrowband tuner, which provides decimated in-phase (I) and quadrature (Q) baseband channels, a finite impulse response (FIR) filter coupled to filter said decimated I and Q baseband channels, and having a transfer characteristic that is matched to the shape of a signal from a co-channel user correlates with said synchronization pattern.

32. A base station signal processing arrangement according to claim 31, wherein said finite impulse response filter comprises a plurality of correlation filters, each of which correlates a decimated baseband signal with a copy of a respectively different synchronization pattern associated with co-channel interferers of said adjacent cells.

33. A base station signal processing arrangement according to claim 31, wherein said signal processor is further operative to derive an output representative of the magnitude of the output of said finite impulse response filter, and a timing selector, which is operative to derive timings of peaks in average sets of correlations of synchronization patterns associated with said co-channel users, said timings of correlation peaks being representative of times of transitions between successive co-channel users' communication time slots relative to the time of transition of said desired user's communication time slot.

34. A base station signal processing arrangement according to claim 33, wherein said signal processor includes a weighting coefficient control operator, which is operative to adjust said set of weighting coefficients, as necessary, to form a directivity pattern whose gain and/or nulls maximize the signal to noise ratio in the presence of co-channel interferer whose whose synchronization pattern correlation peak has been identified by said timing selector.

35. A base station signal processing arrangement according to claim 27, wherein said signal processor is operative to update said weighting coefficients in accordance with participant changes of a plurality of said co-channel users, and to store updated weighting coefficient values, for use in determining weighting coefficients in response to a subsequent transition between successive time slots of any co-channel users in said adjacent cells.

* * * * *

UNITED STATES PATENT AND TRADEMARK OFFICE
CERTIFICATE OF CORRECTION

PATENT NO. : 6,411,612 B1
DATED : June 25, 2002
INVENTOR(S) : Karen W. Halford, Gayle Patrick Martin, Julian Bartow Willingham, Mark A. Webster and Gregory S. Sinclair It is certified that error appears in the above-identified patent and that said Letters Patent is hereby corrected as shown below:

<u>Column 5,</u>
Line 48, delete "she as" insert -- shown as --

<u>Column 8,</u>
Line 67, delete "piecewise-" insert -- piecewise-asymptotic --

<u>Column 11,</u>
Line 21, delete "users," insert -- users' --

<u>Column 14,</u>
Line 46, delete "whose whose" insert -- whose --

Signed and Sealed this

Twenty-second Day of October, 2002

Attest:

JAMES E. ROGAN
Attesting Officer      Director of the United States Patent and Trademark Office